United States Patent [19]
Van Ert

[11] Patent Number: 5,639,329
[45] Date of Patent: Jun. 17, 1997

[54] PROCESS FOR MANUFACTURE OF DECORATED PANELS FOR VEHICLE INTERIORS

[75] Inventor: Jack Van Ert, Rochester Hills, Mich.

[73] Assignee: ASAA Technologies, Inc., Sheboygan, Wis.

[21] Appl. No.: 266,127

[22] Filed: Jun. 27, 1994

Related U.S. Application Data

[62] Division of Ser. No. 673,539, Mar. 22, 1991, abandoned.

[51] Int. Cl.⁶ .................................................. B32B 31/20
[52] U.S. Cl. ........................... 156/214; 156/228; 156/267; 156/293
[58] Field of Search .......................... 156/242, 245, 156/212, 228, 581, 293, 267, 216; 264/511, 277.1

[56] References Cited

U.S. PATENT DOCUMENTS

| | | | |
|---|---|---|---|
| 3,058,154 | 10/1962 | Howard et al. | 156/222 |
| 3,462,328 | 8/1969 | Buckland | 156/293 |
| 3,758,358 | 9/1973 | Kurada | 156/222 |
| 4,237,603 | 12/1980 | Crow | 156/293 |
| 4,323,406 | 4/1982 | Morello | 264/46.4 |
| 4,779,390 | 10/1988 | Repper et al. | |
| 4,978,407 | 12/1990 | Ardissone | 156/216 |
| 4,979,890 | 12/1990 | Bracesco | 156/581 |
| 5,082,609 | 1/1992 | Rohrlach et al. | 264/46.4 |
| 5,091,031 | 2/1992 | Strapazzini | 156/211 |
| 5,236,534 | 8/1993 | Noguti et al. | 156/293 |
| 5,462,786 | 10/1995 | Van Ert | 428/171 |

FOREIGN PATENT DOCUMENTS

| | | | |
|---|---|---|---|
| 0348357 | 12/1989 | European Pat. Off. | |
| 0482270A1 | 4/1992 | European Pat. Off. | |
| 226345 | 10/1986 | Japan | 156/212 |
| 62-142627 | 6/1987 | Japan | 156/267 |
| 211128 | 9/1987 | Japan | 264/511 |
| 158220 | 7/1988 | Japan | 264/511 |
| 1342600 | 1/1974 | United Kingdom | 156/212 |

*Primary Examiner*—Michele K. Yoder
*Attorney, Agent, or Firm*—Foley & Lardner

[57] ABSTRACT

A process for forming decorative panels for automobile interiors uses a compression press, a grooved stationary platen die and a movable platen die with a metal blade edging mounted thereon. The blade edging has a peripheral shape matching the outer wall of the groove in the stationary platen die section, and the contour of the movable platen die matches the contour of the stationary die and a formed decorative panel having a downturned edge of the same peripheral shape as the groove and blade. This downturned edge becomes embedded in a sheet of mounting panel stock upon closing of the compression press.

12 Claims, 3 Drawing Sheets

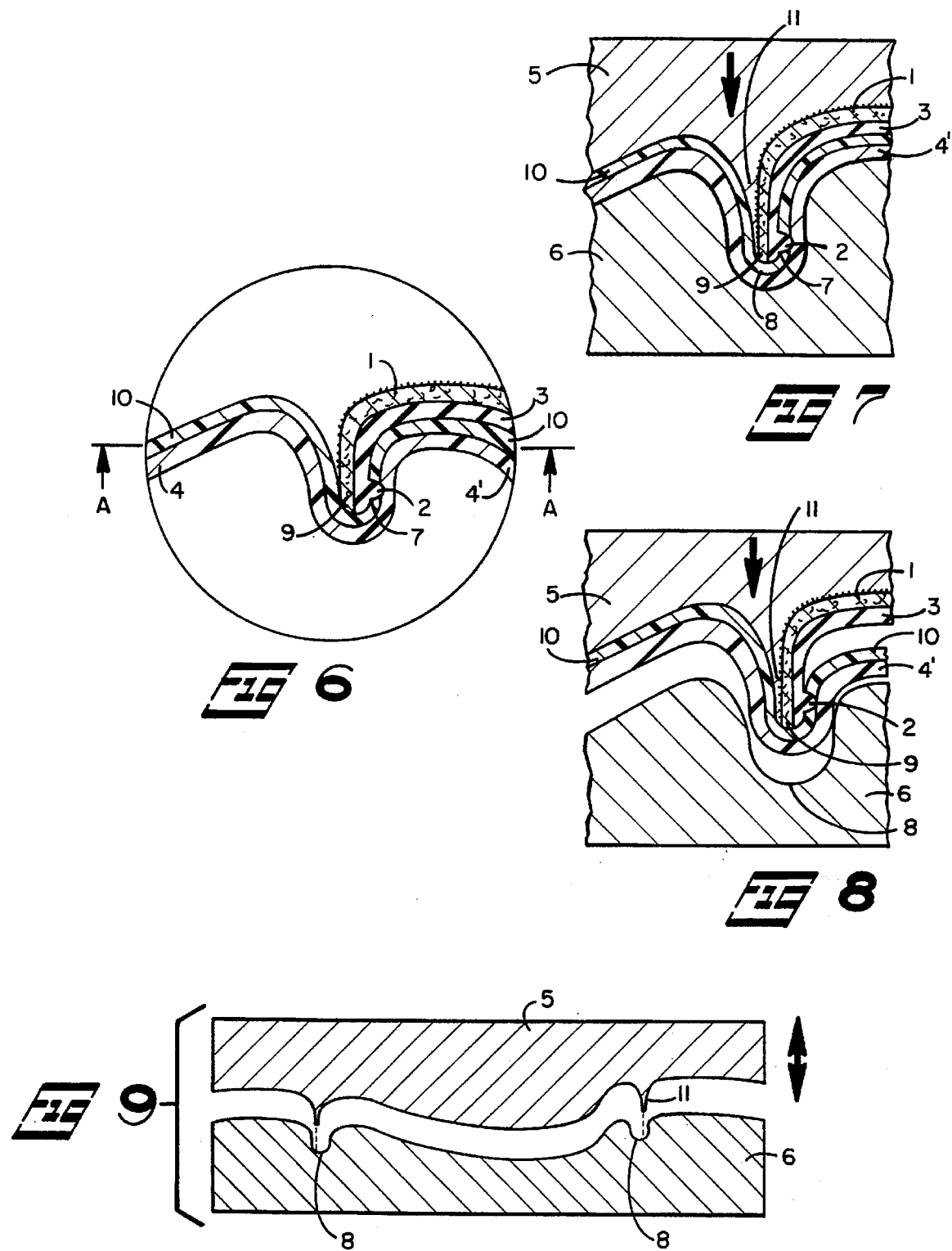

PROCESS FOR MANUFACTURE OF DECORATED PANELS FOR VEHICLE INTERIORS

This application is a divisional of U.S. Ser. No. 07/673,539, filed Mar. 22, 1991, now abandoned.

TECHNICAL FIELD

The disclosure herein relates to decorative panels for automobiles, aircraft and similar interiors, wherein one or more decorated panels are joined to a larger panel. For example, automobile interior door panels are usually decorated in various ways, including decorative panels. Such panels may be made of a sheet of formed plastic or sheet metal, over which a decorative portion may be applied by means of an adhesive and possibly a molding strip. Disclosure is made herein of a unique apparatus and method of joining a decorative panel to a mounting panel, and the product derived therefrom.

BACKGROUND OF THIS INVENTION

Decorative panels have been in use for a long time, particularly in automobiles, for sound and weather proofing. U.S. Pat. No. 4,779,390 for "Lining For The Interior Of An Automotive Vehicle" discloses a foundation panel partitioned into at least two contiguous surface areas by a groove and webs of material laminated on the foundation areas. A seam is provided for tucking portions of the web into the groove, and the web is superposed on an adhesive coating. U.S. Pat. No. 4,781,956 for "Interior Trim Component For A Motor Vehicle" describes a fibrous mat attached to the panel, with various amounts of compression on various areas of the mat. U.S. Pat. No. 4,873,045 for "Method For Manufacturing Automobile Interior Components" describes urethane foam cold pressed on semi-molten thermoplastic resin materials. Other comparable patents include U.S. Pat. Nos. 4,802,948, 4,810,452, 4,923,542, and 4,923,539, Canadian Patent No. 639,500, and Japanese Patent No. 0221737 issued Dec. 23, 1983.

SUMMARY OF THE INVENTION

A decorated panel according to the invention has an overlaid decorative segment or insert attached to the panel with the edge of the decorative segment embedded in a groove formed in a mounting panel stock. Protrusions may be provided on the inner surface of the turned-down edge of the decorative assembly. The protrusions imbed or coin into the groove wall of the mounting panel stock in a manner effective to hinder removal of the edge of the decorative segment from the mounting panel.

A process for making a decorated panel according to the invention involves attaching a decorative insert assembly to a thermoplastic mounting panel stock by embedding a turned-down edge of a decorative assembly in a groove in the mounting panel stock, causing protrusions in the back of the turned-down edge of the decorative assembly to coin into the wall of the groove of the mounting panel stock.

In particular, a process for making a decorative panel of the invention includes the steps of softening a sheet of a mounting panel stock material and placing the heat-softened sheet onto a first die section of a compression press so that the sheet overlies a groove in the first die section. A pre-formed, contoured decorative insert is positioned in conforming contact with a second die section of the compression press, the second die section having a blade configured to fit into the groove of the first die section, and the insert having an projecting edge configured to fit into the groove of the first die section together with the blade. The insert and mounting panel are pressed into close conforming contact with each other between the first and second die sections so that the blade and projecting edge of the insert extend into said groove under conditions effective to press an underlying portion of the softened sheet into the groove and thereby embed the projecting edge of the insert in the softened sheet.

The invention further provides an apparatus for attaching a decorative assembly to a mounting panel stock by means of a press to force a turned-down or projecting edge of a decorative assembly into a heat-softened mounting panel stock and forcing the turned-down edge of the decorative assembly into the mounting panel stock. The apparatus comprises a stationary female die section having a groove therein of the same peripheral shape as the turned-down edge of the decorative assembly, and a male die section mounted on the movable platen and having a metal blade edging mounted in the movable platen male die section. The blade edging is of the same peripheral shape as the outer edge of the groove in the stationary platen female die section, so that the blade edging acting in concert with the turned-down edge of the decorative panel, upon closing the die in the press, causes the turned-down edge of the decorative assembly to be imbedded into the heat-softened mounting panel stock and forced into the groove in the female die section.

BRIEF DESCRIPTION OF DRAWINGS

The invention is further described in the accompanying drawing figures, wherein:

FIG. 6 is a magnified cross-sectional view of fitting the decorative insert into the mounting panel stock;

FIG. 7 is a magnified cross-sectional view of fitting the decorative insert into the mounting panel stock in the closed die;

FIG. 8 is a magnified cross-sectional view of a formed decorative insert edge and a partially formed groove in the mounting panel stock; and FIG. 9 is a cross-sectional view of the forming dies.

DETAILED DESCRIPTION OF PREFERRED EMBODIMENT

Figure 1:
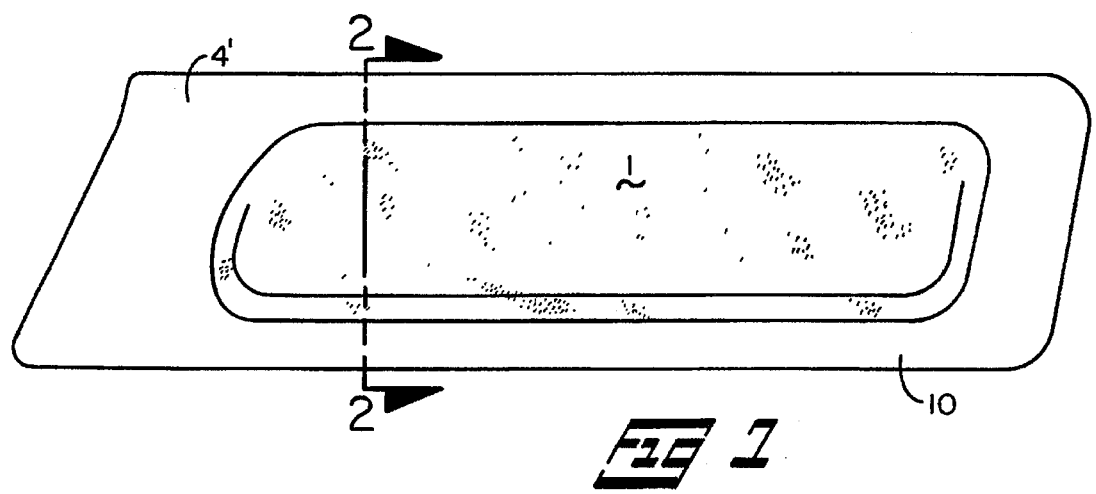
FIG. 1 is a face elevation view of an assembled panel according to the invention.
Figure 2:
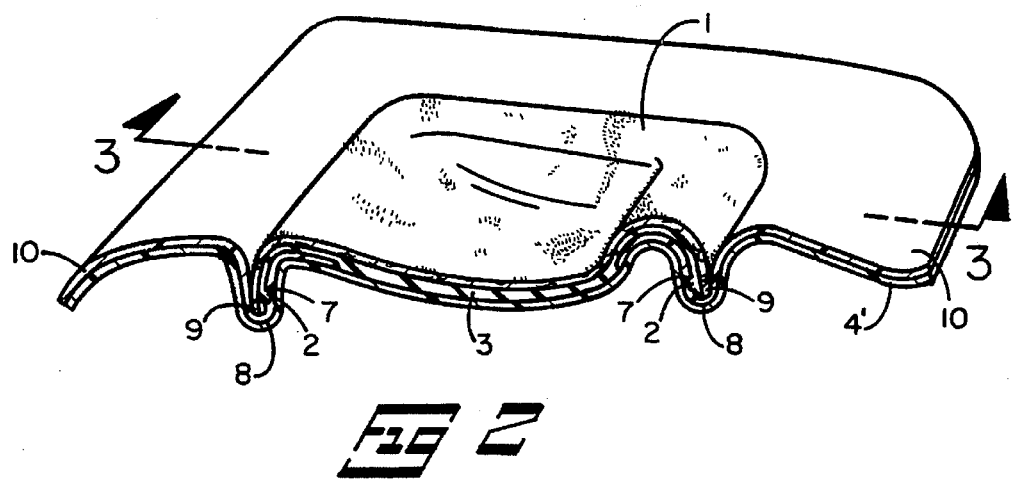
FIG. 2 is a cross-sectional perspective view of the assembled panel taken along the line 2—2 in FIG. 1.
Figure 3:
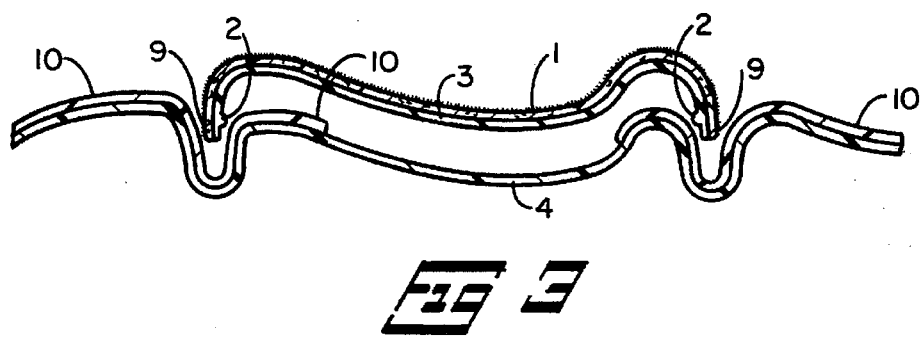
FIG. 3 is an exploded cross-sectional view along the line 3—3 in FIG. 2.

Decorated panels for automobile interiors now usually include a decorative segment or insert panel attached to a mounting panel. A completed decorated panel is shown in FIG. 1, wherein a decorative insert assembly is attached to a mounting panel stock 4'.

The apparatus of the invention includes a movable platen die section 5, and a stationary platen die section 6, which die sections are mounted in a conventional compression press. In the following description, "platen die sections" includes a die mounted on or formed as part of a platen, and "metal blade edging" is to identify a metal strip mounted edgewise on the die section. No further description will be made of the compression press as such, which is well known.

Referring to FIGS. 1-5, the decorative insert of the illustrated embodiment is an assembly of a decorative surface material 1 and a thermoplastic backing 3. Backing 3 of the decorative insert and mounting panel stock 4 are made of sheet stock of a thermoplastic, such as a polyolefin, preferably polypropylene reinforced with fibers such as wood fibers, glass fibers, or plastic fibers. Such fiber reinforced materials may have a density range of 0.95–1.05, a hardness (ASTM 02240) of 82 (Shore A), and a modulus of elasticity (ASTM 0638-80) of 0.3 G.Pa. Backing 3 and mounting panel stock 4 may have a thickness of approximately 0.125 inches, more or less.

A metal blade edging 11 is mounted in movable platen die section 5 to assist in forcing a projecting or downturned edge 9 of the decorative panel, as shown in FIG. 8. FIGS. 4, 5, 7 and 8 show the entry of the components into a groove 8 in lower stationary die section 6. The decorative surface material 1 of the insert is attached to backing 3, and the resulting assembly is heat-formed to include a downturned edge 9 on the outer periphery of the decorative assembly. Backing and surface material 1 are included in downturned edge of the decorative assembly. Decorative surface material 1 is usually a woven or non-woven fabric, and is attached to backing 3 by means of hot-pressing or a hot-melt adhesive.

The foregoing decorative assembly is formed to any desired contoured surface shape that includes downturned edge 9. Protrusions 2 can be formed on the back of downturned edge 9 by heating edge 9 to flexibility and forming protrusions 2 in a die and press. This formed assembly is the decorative insert for subsequent attachment to mounting panel stock 4 in accordance with this invention. The decorative assembly formed with downturned edge 9 is quite rigid at ambient or room temperature, as indicated by the above data, and is attached to mounting panel stock 4 as described hereafter.

Mounting panel stock 4 is heated to its softening point at about 330° to 350° F., and is laid while hot on stationary female die section 6 having groove 8 on the mating surface so that stock 4 overlies groove 8. The decorative assembly of surface material 1 and backing 3 is placed on heated mounting panel stock 4, with downturned edge 9 in alignment with groove 8. Movable die section 5, having a shape conforming to the decorative assembly, is forced by action of the press in which die sections 5, 6 are mounted so that downturned edge 9, acting in concert with metal blade edging 11, becomes embedded in mounting panel stock 4 within groove 8. Protrusions 2 on the back of downturned edge 9 coin into a side wall of a thus-formed groove of mounting panel stock 4.

On cooling of mounting panel stock 4 with the decorative assembly attached thereto, the decorative assembly is rigidly attached to mounting panel stock 4. See FIG. 4, which shows mounting panel stock 4 between movable platen die section 5 and stationary platen die section 6, and FIG. 5, which illustrates the formed mounting panel stock 4' with downturned edge 9 of decorative assembly of decorative surface material 1 and backing 3 coined into formed mounting panel stock 4'.

FIG. 8 illustrates a magnified cross-sectional view of the partially formed mounting panel stock 4' just prior to full closure of die sections 5, 6. FIG. 7 illustrates the mounting of the decorative assembly into formed mounting panel stock 4' in groove 8 and the coining of protrusion 2 to form a dimple 7 as a result of protrusion on edge 9 and metal blade edging 11 into groove 8. Protrusions 2 on the back of backing 3 of the decorative insert are located on the underside of downturned edge 9 of the decorative assembly.

To insure proper and tight fit of the decorative assembly, groove 8 should be of such width to cause a tight or interference fit of downturned edge 9 of the decorative panel into formed mounting panel stock 4'. This results in permanent embedding of downturned edge 9 into formed mounting panel stock 4' as shown in FIG. 7, and coining of protrusions 2 into formed mounting panel stock 4' when platen dies 5 and 6 are forced together with the dies at ambient or controlled temperature to solidify the heat-softened formed mounting panel stock 4' with the decorated assembly imbedded therein.

Figure 4:
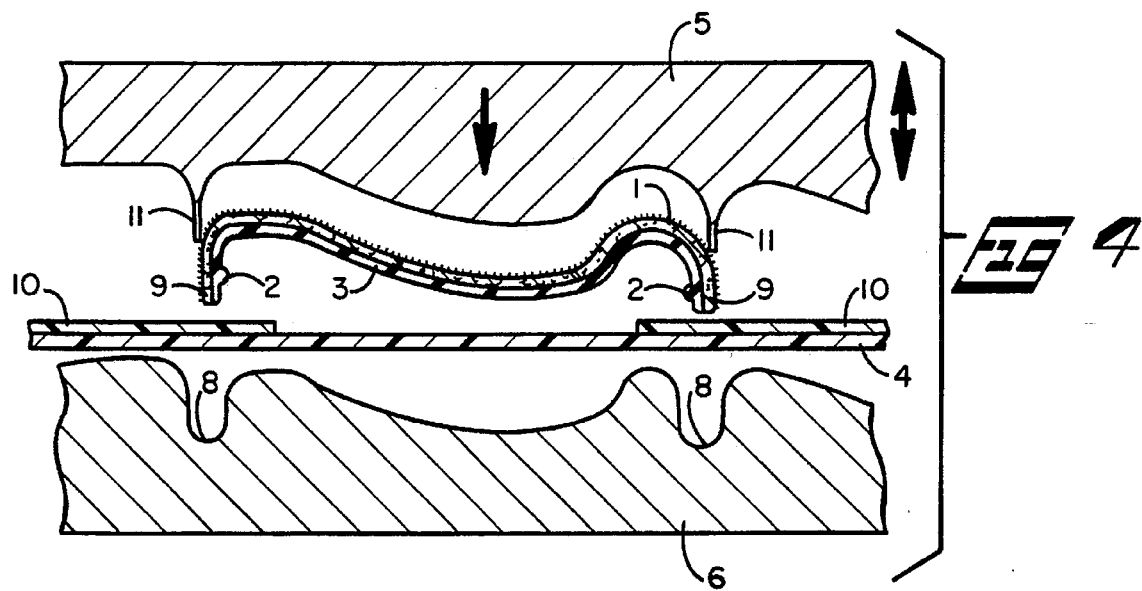
FIG. 4 is a cross-sectional view of a forming die and the components of the decorative panel before closing of the forming die.
Figure 5:
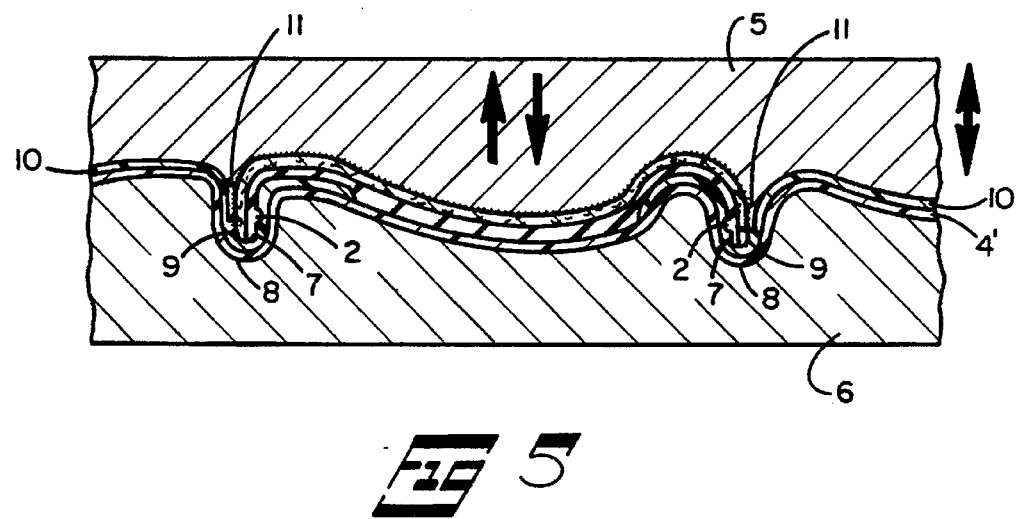
FIG. 5 is a cross-sectional view of the forming die in a closed position, with the completed formed decorative panel.

A decorative overlay sheet 10 made of a thermoplastic such as polyvinyl may be heat-sealed to mounting panel stock 4. Decorative overlay sheet 10 extends laterally inwardly beyond groove 8, as shown in FIG. 4, and may be open at its center, that is, the region to be disposed behind the decorative insert. As shown in FIGS. 6, 7 and 8, decorative overlay sheet 10 extends inwardly beyond the edge of groove 8 and is crimped into groove 8 along with downturned edge of decorative panel 9 of the decorative assembly. In the illustrated embodiment, dimples 7 are formed in sheet 10 at spaced positions corresponding to the locations of protrusions 2.

Decorative overlay sheet 10 may be applied to the top surface of mounting panel sheet stock 4, prior to placing of mounting panel stock 4 in stationary die 6 for mounting of the decorative assembly. Decorative overlay sheet 10 may be a polyolefin or polyvinyl sheet, and may be attached to mounting panel stock 4 by hot-pressing or a hot melt adhesive.

In the method above described, the contour of the completed decorated panel is controlled by the compression die configuration on moveable platen die section 5 and stationary platen die section 6. The temperatures of movable platen die section 5 and stationary platen die section 6 are controlled in a conventional manner by suitable cooling coils as required.

Referring now to FIG. 9, which shows movable platen die section 5 and stationary platen die section 6 in an open press position, metal blade edging 11 is rigidly mounted in movable platen die section 5. Metal blade edging 11 is of such perimeter and contour to match the perimeter of the outer edge of groove 8 in stationary platen die 6. The purpose of metal blade edging 11 is to act in concert along with downturned edge of decorative panel 9 to force mounting panel stock 4 and downturned edge 9 into groove 8. The thickness of metal blade edging 11 is about 0.040 to 0.060 inches.

As shown in the drawings, blade edging 11 may be configured so that, as blade 11 extends into groove 8, it is disposed closer to the outer side wall of groove 8 than to its inner side wall. Edge 9 has a slightly smaller peripheral shape than blade edging 11, so that blade edging 11 is located outwardly of the surface material 1 of and covers surface material 1 during the forming operation as shown in FIG. 8.

I claim:

1. A process for making a decorative panel, comprising:
   softening a sheet of a mounting panel stock material;

placing the softened sheet onto a first die section of a compression press, so that the sheet overlies a groove in the first die section;

positioning a pre-formed, contoured decorative insert into conforming contact with a second die section of the compression press, the second die section having a blade configured to fit into the groove of the first die section together with the blade; and pressing the insert and mounting panel into close conforming contact with each other between the first and second die sections so that the blade and projecting edge of the insert extend into said groove under conditions effective:

to press an underlying portion of the softened sheet into the groove and thereby embed the projecting edge of the insert in the softened sheet, and to press a lateral protrusion formed on a side of the projecting edge of the insert into an outer surface of the heat-softened sheet disposed in the groove, which protrusion coins into the sheet material in a manner effective to hinder removal of the embedded insert edge from the sheet.

2. The process of claim 1, wherein the sheet is made of a thermoplastic material, and the softening step further comprises heating the sheet.

3. The process of claim 1, further comprising forming the sheet material by bonding a decorative thermoplastic overlay having a central opening onto a sheet of thermoplastic material lacking such a central opening, wherein the central opening is configured to be covered by the decorative insert, and an edge of the overlay is pressed into the groove by the blade.

4. The process of claim 1, further comprising forming the sheet material by bonding a decorative thermoplastic overlay having a central opening onto a sheet of thermoplastic material lacking such a central opening, wherein the central opening is configured to be covered by the decorative insert.

5. The process of claim 1, further comprising forming the pre-formed, contoured decorative insert by bonding a thermoplastic backing to a surface material made of a fabric.

6. The process of claim 5, wherein the pressing step further comprises a step of pressing a lateral protrusion formed on a rear face of the thermoplastic backing and positioned on a side of the projecting edge of the insert into an outer surface of the heat-softened sheet disposed in the groove, which protrusion coins into the sheet material in a manner effective to hinder removal of the embedded insert edge from the sheet.

7. The process of claim 5, wherein the positioning step further comprises covering the periphery of the fabric surface material with the blade.

8. The process of claim 1, wherein the positioning step further comprises covering the periphery of the decorative insert with the blade, such that during the pressing step the blade is disposed closer to an outer side wall of the groove than to an inner side wall thereof.

9. A process for making an automotive decorative door panel, comprising:

softening a sheet of a mounting panel stock material;

placing the softened sheet onto a first die section of a compression press, so that the sheet overlies a groove in the first die section;

positioning a pre-formed, contoured decorative insert into conforming contact with a second die section of the compression press, the second die section having a blade configured to fit into the groove of the first die section, and the insert having a projecting edge configured to fit into the groove of the first die section together with the blade; and pressing the insert and mounting panel into close conforming contact with each other between the first and second die sections so that the blade and projecting edge of the insert extend into said groove under conditions effective:

to press an underlying portion of the softened sheet into the groove and thereby embed the projecting edge of the insert in the softened sheet while covering the periphery of the decorative insert with the blade, such that the blade is disposed closer to an outer side wall of the groove than to an inner side wall thereof, and to press a lateral protrusion formed on an inner side of the projecting edge of the insert into an outer surface of the heat-softened sheet disposed in the groove, which protrusion coins into the sheet material in a manner effective to hinder removal of the embedded insert edge from the sheet.

10. The process of claim 9, wherein the sheet is made of a thermoplastic material, and the softening step further comprises heating the sheet.

11. The process of claim 9, further comprising forming the pre-formed, contoured decorative insert by bonding a thermoplastic backing to a surface material made of a fabric.

12. The process of claim 11, wherein the positioning step further comprises covering the periphery of the fabric surface material with the blade.

* * * * *